US008538232B2

(12) United States Patent
Chandra

(10) Patent No.: US 8,538,232 B2
(45) Date of Patent: Sep. 17, 2013

(54) SYSTEMS AND METHODS FOR MANAGING VIDEO DATA

(75) Inventor: Anil Chandra, Merrylands (AU)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 13/001,272

(22) PCT Filed: Jun. 24, 2009

(86) PCT No.: PCT/US2009/048349
§ 371 (c)(1),
(2), (4) Date: Dec. 23, 2010

(87) PCT Pub. No.: WO2009/158365
PCT Pub. Date: Dec. 30, 2009

(65) Prior Publication Data
US 2011/0110643 A1   May 12, 2011

(30) Foreign Application Priority Data
Jun. 27, 2008 (AU) ................................ 2008903277

(51) Int. Cl.
*H04N 5/932* (2006.01)
(52) U.S. Cl.
USPC ......................................... 386/210; 386/278
(58) Field of Classification Search
None
See application file for complete search history.

(56) References Cited

U.S. PATENT DOCUMENTS

| 7,228,055 | B2 | 6/2007 | Murakami et al. |
| 2005/0046703 | A1 | 3/2005 | Gutler |
| 2007/0124782 | A1* | 5/2007 | Hirai et al. .................... 725/105 |
| 2008/0231708 | A1* | 9/2008 | Morimoto et al. ............ 348/159 |
| 2008/0263010 | A1* | 10/2008 | Roychoudhuri et al. ......... 707/3 |
| 2008/0282296 | A1* | 11/2008 | Kawai et al. .................... 725/62 |
| 2008/0309759 | A1* | 12/2008 | Wilson et al. ................. 348/143 |

FOREIGN PATENT DOCUMENTS
KR    20040073069 A1    8/2004

* cited by examiner

*Primary Examiner* — Huy T Nguyen
*Assistant Examiner* — Eileen Adams
(74) *Attorney, Agent, or Firm* — Seager Tufte & Wickhem LLC.

(57) ABSTRACT

Described herein are systems and methods for managing video data. In overview, various embodiments provide software, hardware and methodologies associated with the management of video data. In overview, a video management system (such as a surveillance system) includes a plurality of camera servers, each of which being configured to make available stored video data for one or more assigned cameras. A given one of the cameras is reassigned from a first one of the camera servers to a second one of the camera servers. The system is configured such that, in the event that a client places a request for video data from that camera for a time period overlapping with the reassignment, the client is provided with a playback stream that seamlessly traverses the reassignment.

10 Claims, 14 Drawing Sheets

SYSTEMS AND METHODS FOR MANAGING VIDEO DATA

FIELD OF THE INVENTION

The present invention relates to systems and methods for managing video data. Embodiments of the invention have been particularly developed for providing seamless playback of video data made available by distributed camera servers. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

A known approach for providing video surveillance is to install a plurality of cameras for collecting video data, connect those cameras to a common computer network, and assign those cameras across a number of camera servers on the network. Each camera server has three main purposes: firstly, to make available live video data collected from its one or more assigned cameras; secondly, to record video data collected from its one or more assigned cameras; and thirdly, to make available the recorded video data.

Generally speaking, video data is "made available" in the sense that it is accessible by a client over the network. For example, a client connects to a camera server, and streams a clip of video data that is made available by that camera server.

There may be situations where a particular camera is initially assigned to a first camera server, and later assigned to a second camera server. For example, this may occur where the first camera server is brought offline for maintenance and the camera manually reassigned, or subject to a camera server failover procedure as discussed in PCT/AU2008/000099. In known systems, a client wishing to view video data from that camera is required to separately obtain clips from each of the camera servers. This is by no means ideal, particularly in security applications, given the potential for confusion or misinterpretation of footage obtained around the time of the camera server reassignment.

There is a need in the art for improved systems and methods for managing video data.

SUMMARY OF THE INVENTION

It is an object of the present invention to overcome or ameliorate at least one of the disadvantages of the prior art, or to provide a useful alternative.

One embodiment provides a system for managing video data, the system including:

a plurality of camera servers, wherein each camera server is configured to make available stored video data for one or more assigned cameras, wherein the plurality of camera servers include:

a first camera server to which a first camera was assigned from $T_0$ to $T_n$; and a second camera server for which the first camera server was assigned from $T_{n+1}$ to $T_{n+1}$;

wherein, in response to a client request to deliver video data for the first camera, the data including video data at $T_n$ and $T_{n+1}$, the first camera server provides to the client, in combination with the video data at $T_n$, data indicative of the second camera server.

The phrase "in combination with the video data at $T_n$, data indicative of the second camera server" should be read broadly enough to include the two aspects of data being provided in the same communication, adjacent communications, or temporally proximal communications. For example, in one embodiment the data indicative of the second camera server is provided prior to the video data at $T_n$, in one embodiment the data indicative of the second camera server is provided at substantially the same time as the video data at $T_n$, and in one embodiment the data indicative of the second camera server is provided just following the video data at $T_n$.

One embodiment provides a method performable by a first camera server for managing video data, the method including the steps of:

(a) receiving data indicative of a request to deliver video data including video data at $T_n$ and $T_{n+1}$, wherein the data at $T_n$ is made available by the first camera server and the data at $T_{n+1}$ is made available by a second camera server; and (b) delivering, to the client, one or more data packets in response to the request, wherein one packet is a terminal packet including a plurality of sequential video frames prior to and including a video frame at $T_n$, and data indicative of the second camera server.

One embodiment provides a method for managing video data in a system including a plurality of camera servers, wherein each camera server is configured to make available stored video data for one or more assigned cameras, the method including the steps of:

(a) receiving, from a client, a request to deliver video data in relation to a camera from $T_0$ to $T_x$;

(b) querying a central database that maintains data indicative of the camera server that makes available stored video data for each camera at given times, thereby to identify the camera server or camera servers that make available the video data relating to the camera from $T_0$ to $T_x$;

(c) identifying a first camera server that makes available video data relating to the camera at $T_0$;

(d) instructing the first camera server to deliver to the client video data commencing at $T_0$.

One embodiment provides a system for managing video data, the system including:

a plurality of camera servers, wherein each camera server is configured to make available stored video data for one or more assigned cameras, the method including the steps of:

a client for providing a request to deliver video data in relating to a camera from $T_0$ to $T_x$;

a central server that is responsive to the request for querying a central database that maintains data indicative of the camera server that makes available stored video data for each camera at given times, thereby to identify a first camera server that makes available video data relating to the camera at $T_0$.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing video data. In overview, various embodiments provide software, hardware and methodologies associated with the management of video data. In overview, a video management system (such as a surveillance system) includes a plurality of camera servers, each of which being configured to make available stored video data for one or more assigned cameras. At some point in time, a given one of the cameras is reassigned from a first one of the camera servers to a second one of the camera servers. The system is configured such that, in the event that a client places a request for video data from that camera for a time period overlapping with the reassignment, the client is provided with a playback stream that seamlessly traverses the reassignment.

System Level Overview

Figure 1:
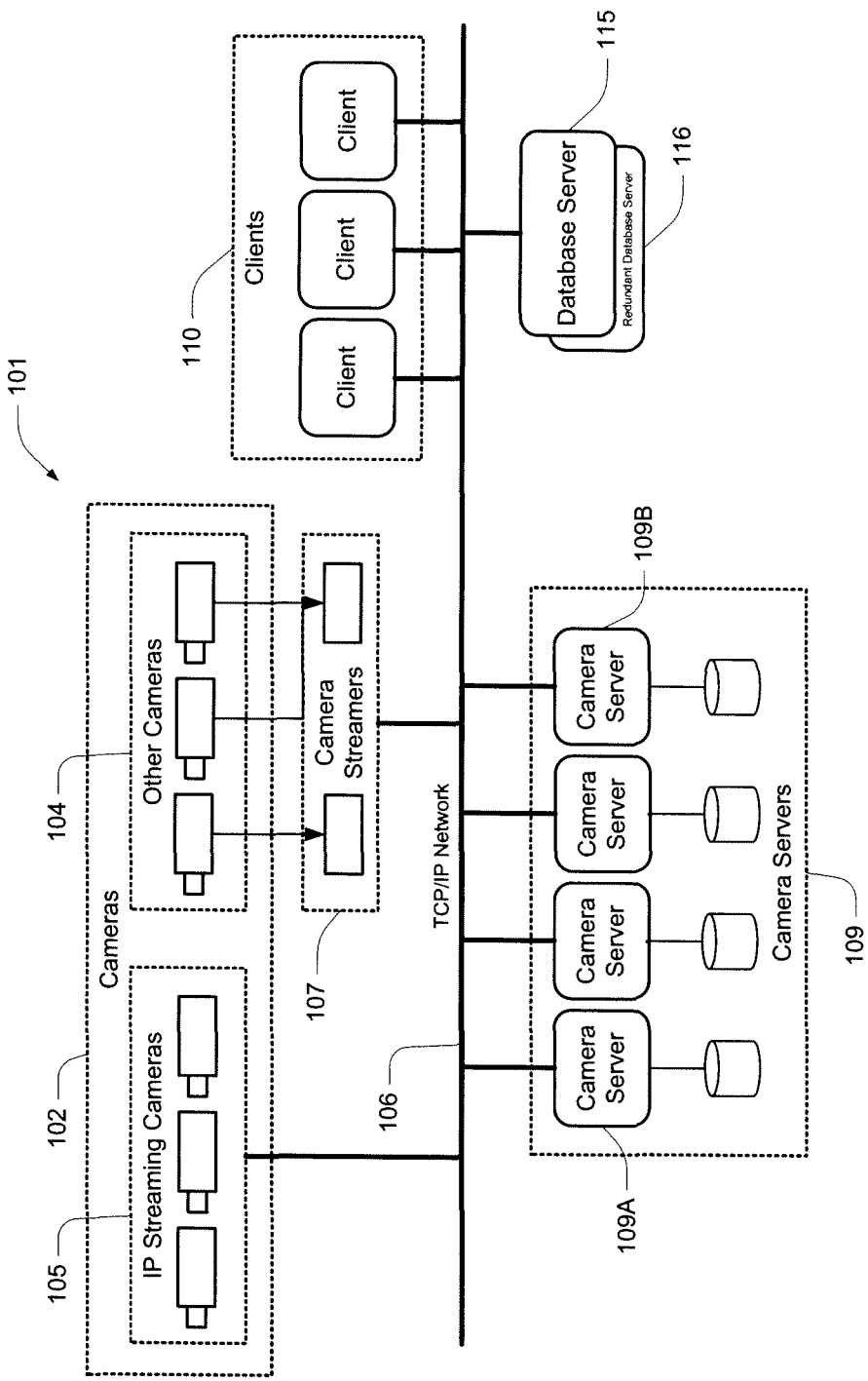
FIG. 1 illustrates a DVM system according to one embodiment.

FIG. 1 illustrates a Digital Video Management (DVM) system 101. System 101 includes a plurality of cameras 102. Cameras 102 include conventional cameras 104 (including analogue video cameras), and IP streaming cameras 105. Cameras 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a camera streamer 107 is required to convert a captured video signal into a format suitable for IP streaming. A plurality of digital cameras 104 can be connected to a single streamer 107, however it is preferable to have the streamer in close proximity to the camera, and as such multiple streamers are often used. In some embodiments the IP streamers are provided by one or more camera servers.

Two or more camera servers 109 are also connected to network 106 (these may be either physical servers or virtual servers). Each camera server is enabled to have assigned to it one or more of cameras 102. This assignment is carried out using a software-based configuration tool, and it follows that camera assignment is virtual rather then physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the camera encoder to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras being assigned to a common camera server, this is a conceptual notion, and is essentially no different from a camera server being assigned to one or more cameras.

Camera servers 109 include a first camera server 109A and a second camera server 109B. These camera servers are used for the purposes of explaining various functionalities of system 101 further below.

Clients 110 execute on a plurality of client terminals, which in some embodiments include all computational platform on network 106 that are provided with appropriate permissions. Clients 110 provide a user interface that allows surveillance footage to be viewed in real time by an end-user. In some cases this user interface is provided through an existing application (such as Microsoft Internet Explorer), whilst in other cases it is a standalone application. The user interface optionally provides the end-user with access to other system and camera functionalities, including the likes of including mechanical and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a database server 115. Database server 115 is responsible for maintaining various information relating to configurations and operational characteristics of system 101. In the present example, the system makes use of a preferred and redundant database server (115 and 116 respectively), the redundant server essentially operating as a backup for the preferred server. The relationship between these database servers is generally beyond the concern of the present disclosure.

Database server 115 additionally maintains data indicative of the camera server that makes available stored video data for each camera at given times. This is discussed in more detail further below, by reference to the manner in which this database is provided with such information.

Recording of Video Data

Figure 2:
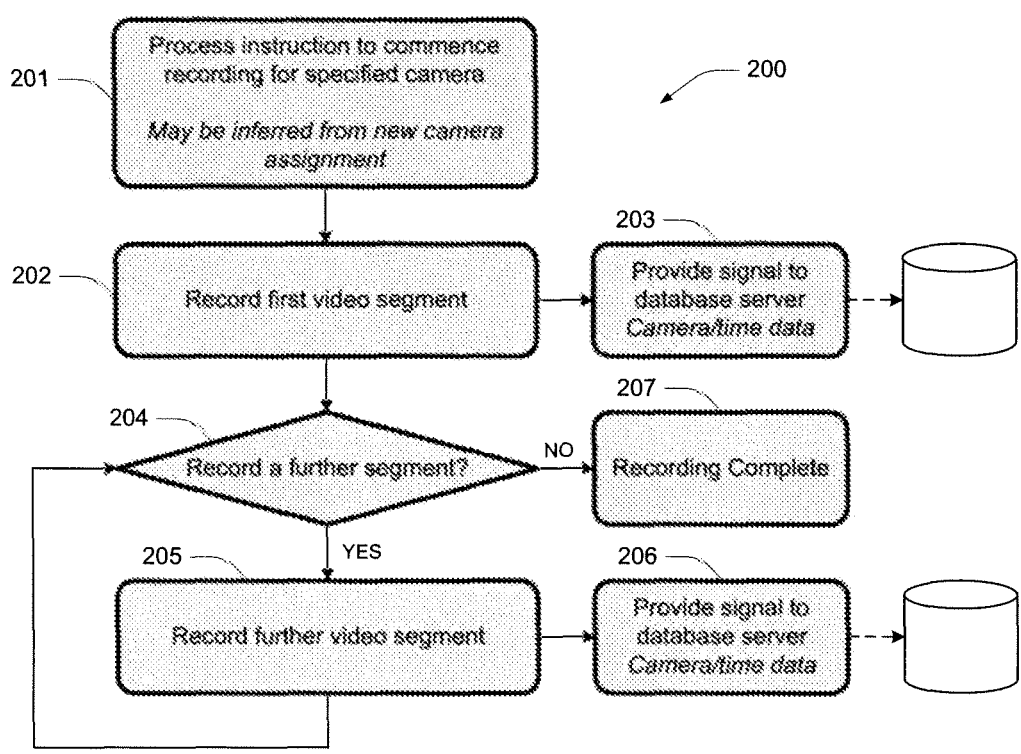
FIG. 2 illustrates a method according to one embodiment.

FIG. 2 illustrates an exemplary method 200 performed by a camera server 109. Method 200 includes, at 201, processing an instruction to commence recording at a given camera. For example, in some situation this instruction is inherently provided by data indicative of the assignment of that camera to the camera server in question. In other situations the instruction results from a user command, or based on predetermined rules in the system (such as a recording schedule or an event triggered by an analytics component). Step 202 includes commencing recording of a first segment of video data. In the present embodiment, video data is stored by camera servers as "segments", each segment including one or more frames of video data. Step 203 includes providing a signal to database server 115 indicative of the segment. This signal is indicative of the time this segment was recorded (typically on the basis of a global clock for the network) and the camera from which the video data originated. On the basis of this signal, database 115 is able to maintain a record of the camera server that maintains video data for a given camera at a given point in time. For example, the database may maintain records which are each indicative of a camera, a start/finish time, a segment ID, and a camera server.

Decision 204 includes determining whether or not to record a further segment for the camera in question. This decision is shown for the purpose of explanation only, and is in some embodiments not explicitly performed by the camera sever. That is, the camera server may continue to record segments from a given camera until an instruction to cease recording is received. Step 205 includes recording a further segment of video data, and step 206 includes providing a signal to that database server regarding that segment. The process then loops to decision 205, and this loop continues until recording ceases at step 207. Recording may cease, for example, upon the reassignment of the relevant camera to a different camera sever.

It will be appreciated that method 200 is interchangeable with various similar methods which achieve the same general purposes, being to record video data from an assigned camera, and to inform the database server that data has been recorded from that camera at a given time.

Requesting Playback of Video Data

A user is able to view playback of stored video data via a client 110. To this end, a client provides a request indicative of a camera from which playback is desired, and a time window. This time window may define either bounded playback (i.e. where a start time and end time is nominated) or unbounded playback (where only a start time is nominated).

For the sake of the present embodiments, a request for video data is described in terms of boundaries $T_0$ and $T_x$. The former defines a start point, and the latter defines an end point. However, in the case of unbounded playback, the latter need not be precisely defined. That is, $T_x$ is optionally an undefined future point, and implied.

Figure 3:
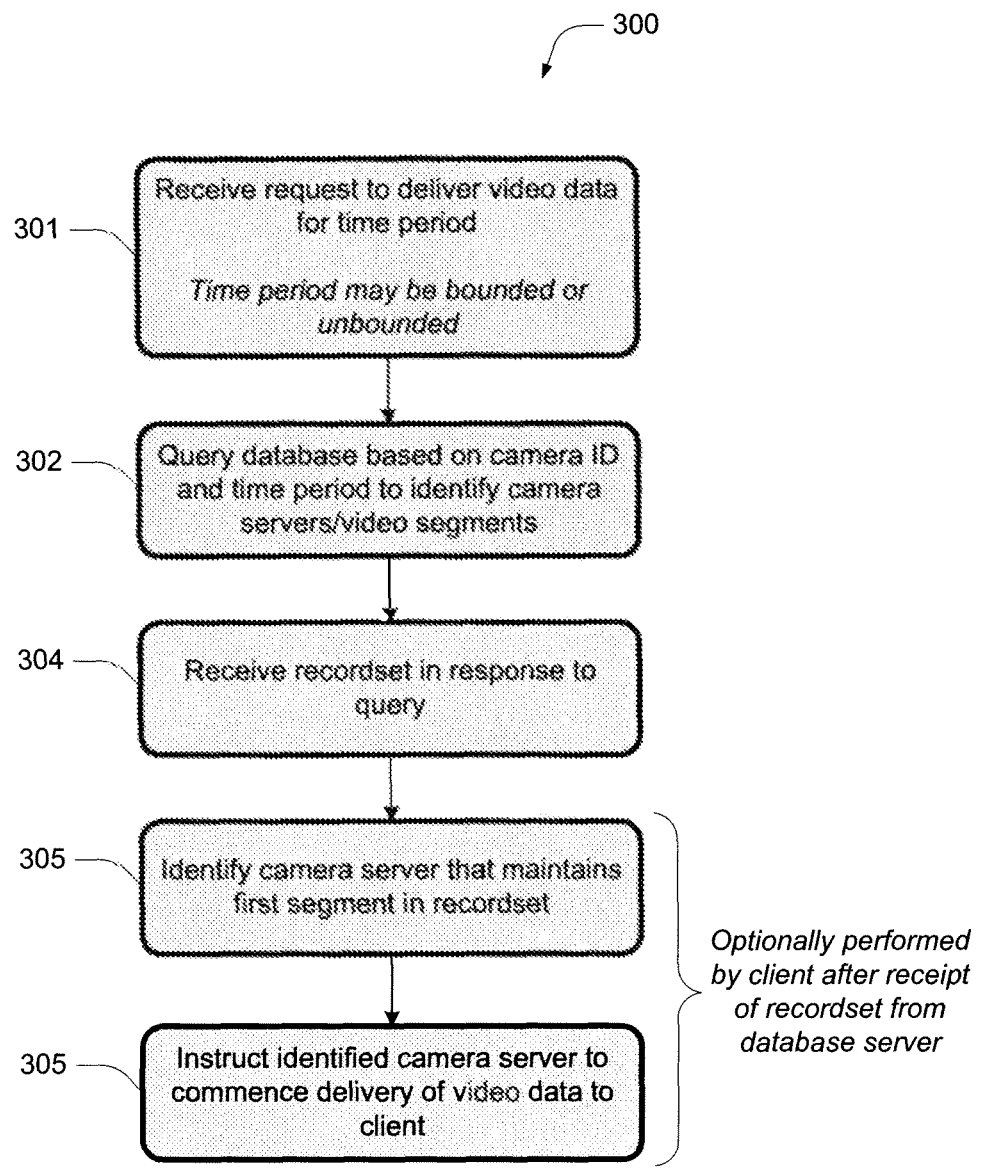
FIG. 3 illustrates a method according to one embodiment.

A request for playback of video data is, in the present embodiment, processed by database server 115. FIG. 3 illustrates an exemplary method 300 preformed by the database server. Step 301 includes receiving, from a client, a request to deliver video data in relating to a camera from $T_0$ to $T_x$. Step 302 includes querying the database, thereby to identify the camera server or camera servers that make available the video data relating to the camera from $T_0$ to $T_x$. For example, it may be identified that camera server 109A maintains footage from $T_0$ to $T_x$. However, there may also be situations where for $T_n$ and $T_{n+1}$ between $T_0$ and $T_x$, the data at $T_n$ is made available by a camera server 109A and the data at $T_{n+}$, is made available by camera server 109B. In some embodiments, the query is provided with parameters describing a camera ID and a start time. In some embodiments additional parameters are used, including an end time and a maximum number of segments.

The nomenclature of $T_n$ and $T_{n+1}$ is intended to describe two points in time. These need not be separated by any specific time period. In general terms, $T_n$ describes a point in time corresponding to the final frame of video data maintained at camera server 109A, and $T_{n+1}$ describes a point in time corresponding to the next known frame of video data for that camera, which is maintained at camera server 109B.

In response to the query at step 302, the database returns a recordset describing one or more segments of recorded video data, and the camera server responsible for each segment. These segments, if played back sequentially as a continuous stream, provide the video data corresponding to the request to deliver video data in relation to a camera from $T_0$ to $T_x$ (or, where a maximum recordset size is realized, from $T_0$ to a point in time prior to $T_x$). The recordset is received at step 304.

The use of a recordset allows for the definition of an abstracted clip. An "abstracted clip" describes video data over a time period (which may be bounded or unbounded) in terms of file locations. This differs from the traditional notion of a clip, which describes an individual video file.

Step 305 includes identifying a first camera server that makes available video data relating to the camera at $T_0$. This is typically the first camera server identified in the recordset and, for the present purposes, is assumed to be camera server 109A. Step 306 includes instructing camera server 109A to deliver to the client video data commencing at $T_0$.

In another embodiment, the database server simply provides the recordset to the client, and the functionalities of steps 304 and 305 are performed at the client side.

Seamless Playback

Figure 4:
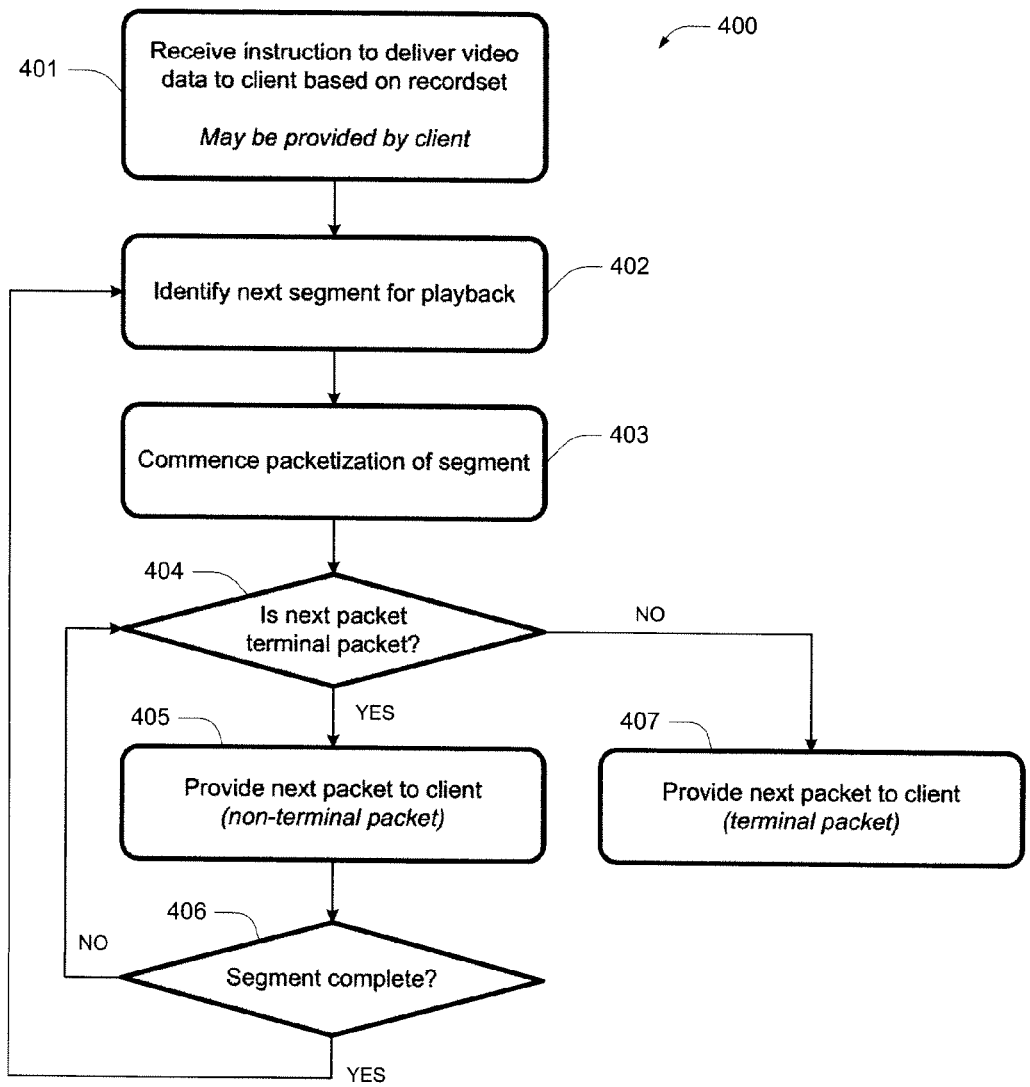
FIG. 4 illustrates a method according to one embodiment.
Figure 5:
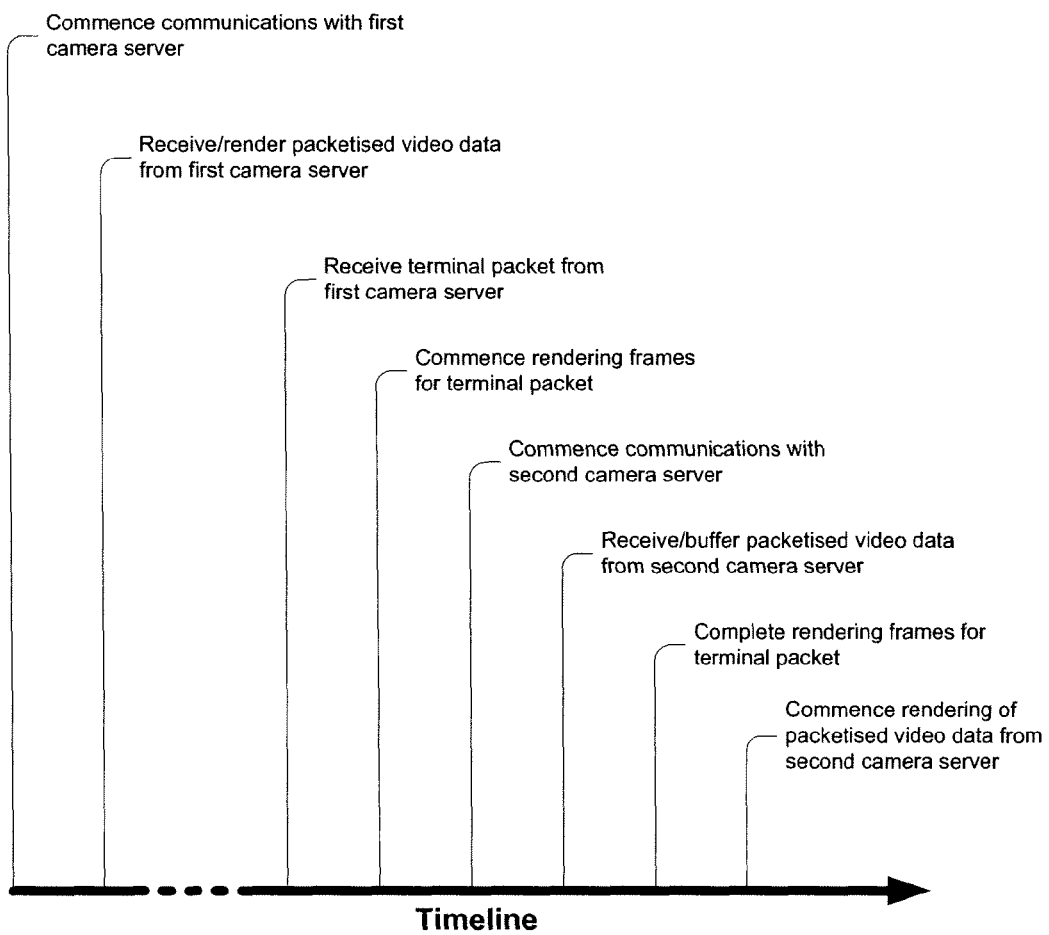
FIG. 5 illustrates a timeline of events according to one embodiment.

The use of a recordset, as discussed above, allows for the abstraction of a video clip from a plurality of segments, which may be distributed between camera servers. FIG. 4 illustrates a method 400 which allows for seamless playback of video data even where the video clip (i.e. the recordset) jumps between camera servers. For the sake of the present example, it is assumed that for $T_n$ and $T_{n+1}$ between $T_0$ and $T_x$, the data at $T_n$ is made available by a camera server 109A and the data at $T_{n+1}$ is made available by camera server 109B.

The term "seamless" is meant to describe a process that does not require user intervention. Although, in some cases, the playback is substantially pause or jitter free across the move between camera servers, this is not in all cases achieved (for example due to processing/communication delays or the like).

Step 401 includes receiving data indicative of a request to deliver video data to a client. This data may be provided by database server 115 or by a client, and is in broad terms indicative of an instruction to deliver video data in accordance with a recordset. In response to this data, the camera server identifies the next segment for playback at step 402. This segment is subsequently packetized and streamed to the client. Each packet includes data indicative of one or more video frames, and in some embodiments a packet corresponds to a segment. Packetizing commences at step 403. At decision 404 the next packet is categorized as either a non-terminal packet or terminal packet. Categorization of a packet as a non-terminal packet occurs in the event that there are further frames to be provided by the camera server in question in a subsequent packet (relating to the present or a subsequent segment). Categorization of a packet as a terminal packet occurs in the event that there are no more frames to be provided by the camera server (relating to the present or a subsequent segment). For example, this may occur where the next segment in the recordset is maintained on a different camera server, or where $T_x$ has been reached.

In the event that the next packet is categorized as a non-terminal packet, a non-terminal packet is delivered at step 405. After this depending on whether this is the final segment for this camera server (decision 406) the method loops to either step 402 or decision 404.

In the event that the next packet is categorized as a terminal packet, a terminal packet is delivered at step 407. Where the next segment in the recordset is maintained on a different camera server, the terminal packet provided at step 406 is, at least in some embodiments, indicative of the next camera server (which in the present example is assumed to be camera server 109B). That is, camera server 109A delivers to the client one or more data packets in response to the request, wherein one packet is a terminal packet including a plurality of sequential video frames prior to and including a video frame at $T_n$, and data indicative of the second camera server.

In the context of some embodiments described herein, a terminal packet includes plurality of sequential video frames prior to and including a video frame at $T_n$, and data indicative of the second camera server. However, in other embodiments a terminal packet includes no video frames; simply data indicative of the second camera server.

From a client-side perspective, a terminal packet is processed upon receipt to identify whether it is necessary to connect to another camera server. In the present example, a client 110 processes a terminal packet from server 109A, this packet being indicative of camera server 109B. The client is responsive to this terminal packet for both rendering the one or more frames provided by that packet, and opening a socket connection with camera server 109B to obtain frames for the next segment. Video data from server 109B may be buffered such that its playback commences in the client immediately following the final frame from server 109A, providing seamless continuous playback of the overall abstracted clip in spite of the camera server reassignment.

FIG. 6 schematically illustrates playback of an abstracted clip from camera servers 109A and 109B. This figure shows events on a timeline (which is not to scale), and depicts a situation where video data is obtained from the second of the camera servers and buffered in readiness for rendering at the client prior to the completion of rendering of the terminal packet from the first of the camera servers.

Recording Gaps

There may be situations where a recording gap exists between from $T_0$ to $T_x$, for example where there is a time delay between camera reassignments, or where a camera is offline for a period of time. Some embodiments implement an approach whereby such video gaps are "played" in real time. That is, in the process of viewing an abstracted clip from $T_0$ to $T_x$, if a recording gap exists between $T_m$ to $T_{m+1}$, a filler (such as a blank frame or an information frames) is displayed at the client from $T_m$ to $T_{m+1}$. That is, if there is a 10-second recording gap, a corresponding 10-second filler is displayed (assuming playback at normal rate). Such an approach assists in demonstrating to users the amount of time that is not able to be viewed.

For the purposes of implementing recording gaps, camera servers are configured to provide a recording gap packet where there is a time gap between the end of a current segment and the commencement of the next segment in the recordset. For example, the recording gap packet is indicative of a period of time (optionally defined in terms of frames/frame rate) for the gap.

In some embodiments, the client provides an option to skip or contain recording gaps. That is recording gaps are either skipped or shortened in length during playback of an abstracted clip.

Exemplary Timing Diagrams

Figure 6A:
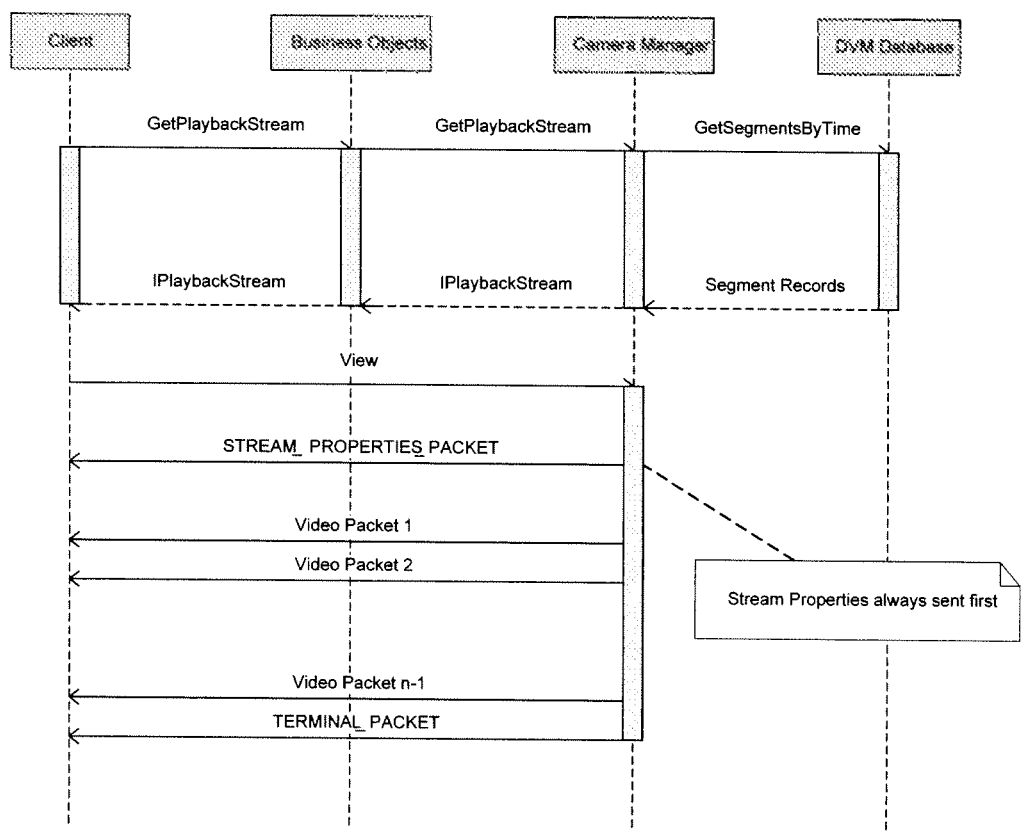
FIG. 6A is a timing diagram according to one embodiment.
Figure 6B:
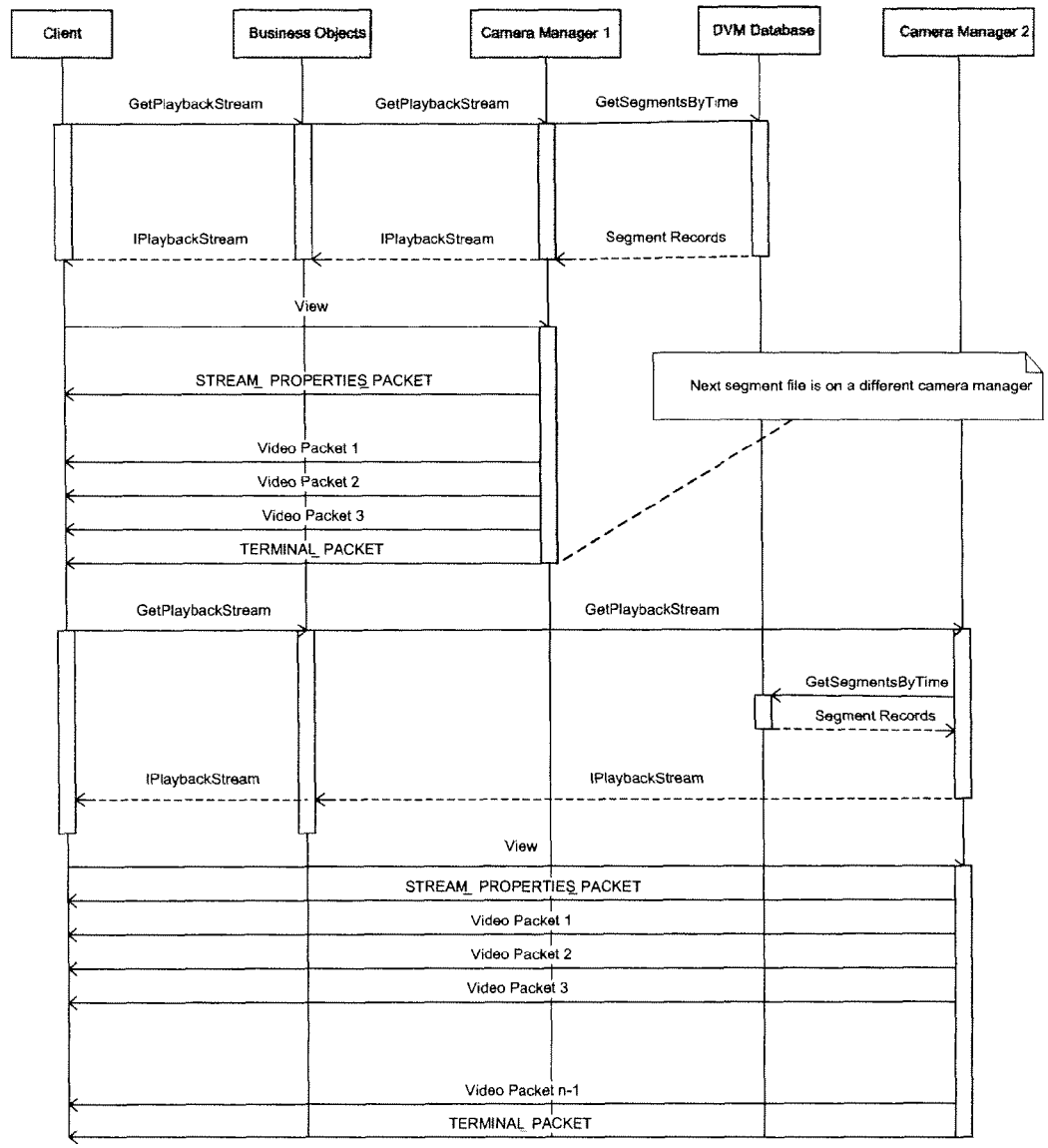
FIG. 6B is a timing diagram according to one embodiment.
Figure 6C:
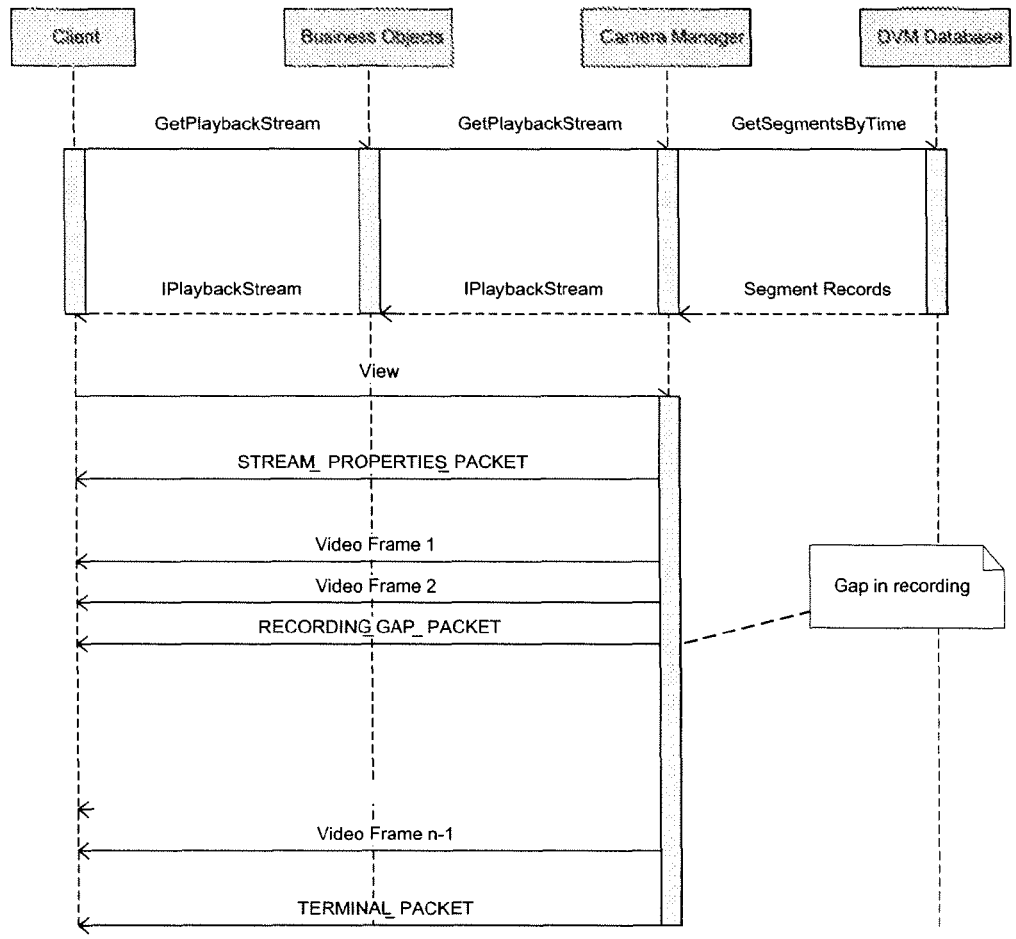
FIG. 6C is a timing diagram according to one embodiment.

Exemplary timing diagrams in relation to a particular embodiment are provided by FIG. 6A, FIG. 6B and FIG. 6C. In this embodiment, an object oriented architecture is used for interfacing clients with a database. Specifically, clients communicate with a DVM database via business objects. Additionally, each camera server executes a "camera manager" application.

FIG. 6A illustrates ordinary operation. Clients get access to an IPlaybackStream interface of a camera manager through the business objects. When a playback stream is created, all the initial segment data (i.e. a recordset) is obtained from the DVM database before the IPlaybackStream is returned. When view is called on the playback stream, the initial packet sent is a "stream properties packet" (unless no video is available, in which case either a terminal packet or a gap packet is sent). Such a packet describes various aspects of the video data, such as a compression, resolution, and the like. Video packets are delivered, culminating in a terminal packet.

FIG. 6B illustrates a situation where concurrent segment files in a recordset are distributed between two camera managers. The client is responsive to the receipt of a terminal packet from the first camera manager for commencing communication with the second camera manager which, in this embodiment, interfaces with the DVM database to determine a recordset.

FIG. 6C illustrates a situation where a recording gap exists, and a recording gap packet provided.

Implementation Options

Figure 7A:
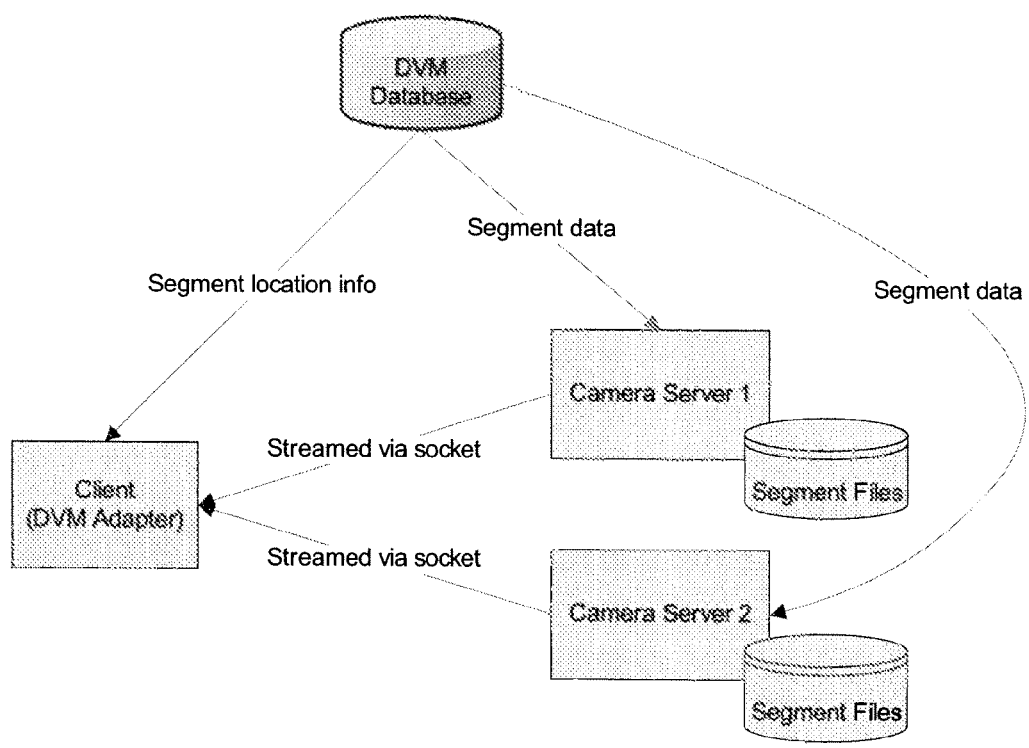
FIG. 7A schematically illustrates a system according to one embodiment.

The embodiments described above generally follow the approach illustrated in FIG. 7A. That is, a client communicates with a DVM database to obtain segment location information (i.e. a recordset), and communicates with camera servers via socket connections for the delivery of video data. This design is advantageous in the sense that no segment data is transferred between camera servers. When a camera server encounters a segment on another camera server, it sends a message to the client (via a terminal packets). It is the responsibility of the client to connect to the camera server on which the next segment resides. In some cases, the client achieves this by identifying the correct camera server by asking the DVM database (the business objects will return an IPlayback- Stream residing on the correct camera server). The client can then receive segment data via sockets as per normal.

Figure 7B:
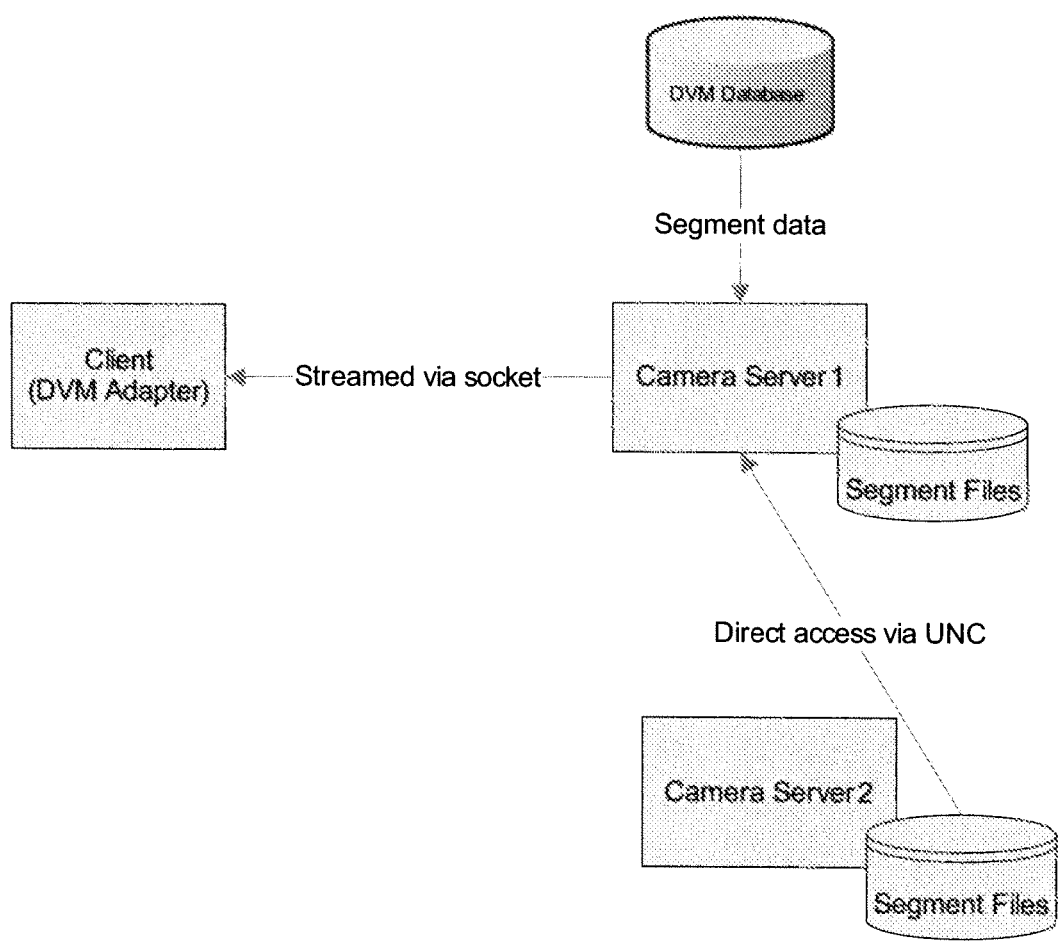
FIG. 7B schematically illustrates a system according to one embodiment.

In the alternative design of FIG. 7B, one camera server accesses segment files on another camera server via UNC paths. That is, if while playing video, Camera Server 1 fords that the next segment file physically resides on Camera Server 2, Camera Server 1 will obtain the appropriate file from Camera Server 2's file system through UNC notation. For example, the file is in camera server 2's F:\clips\file.dvs, and then camera server 1 will access the file as \\CS2\F$\clips\file.dvs. Once the remote segment file is read by camera server 1 the content will be streamed to the client via sockets as per normal. This requires all clip directories to be shared, and may pose security concerns as well as concerns that it may complicate the configuration and maintenance of the system. This approach, however, requires minimal design and development effort.

Figure 7C:
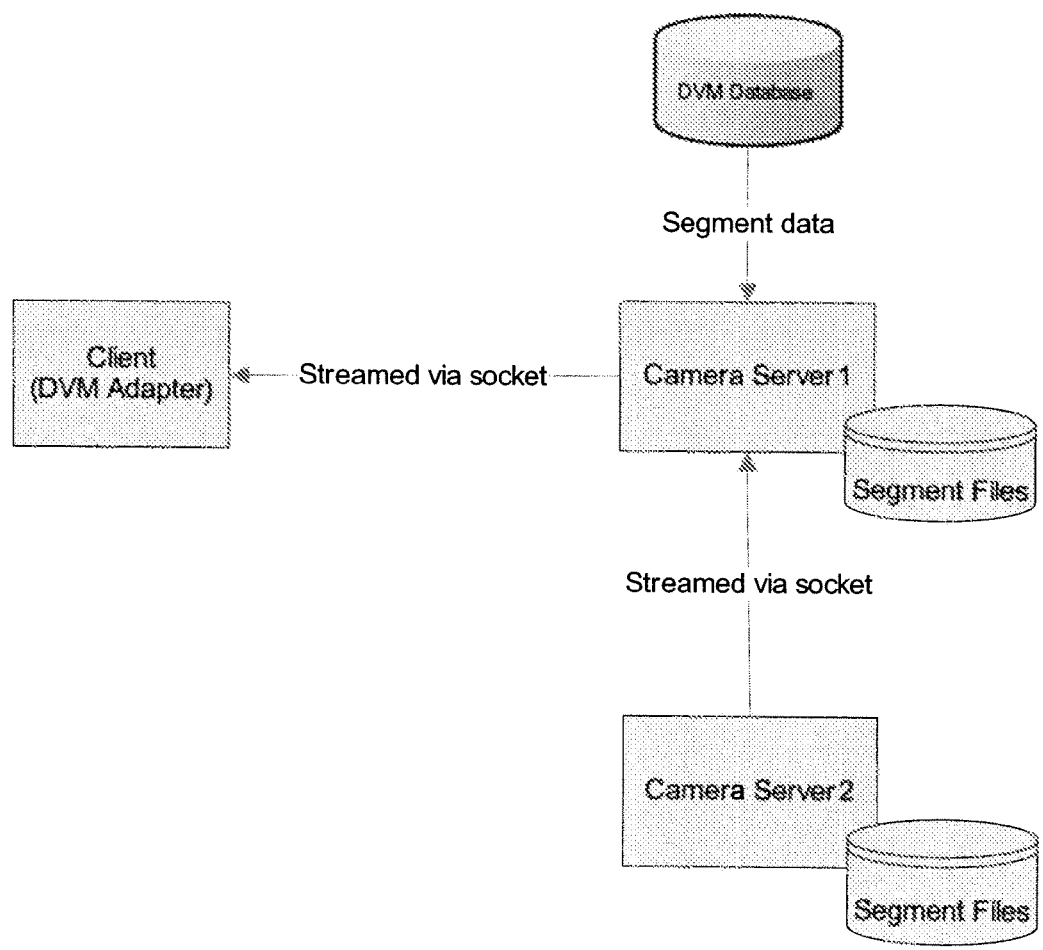
FIG. 7C schematically illustrates a system according to one embodiment.

The example of FIG. 7C is similar to that of FIG. 7B, except instead of accessing remote segments via UNC paths, Camera Server 1 receives the required data from Camera Server 2 by way of a socket connection similar to that between a camera server and a client. This assists in addressing security concerns, but presents disadvantages in terms of bandwidth.

Segment Caching

In some embodiments, when a bounded clip is requested, the client provides a clip ID and the camera manager obtains all the segments for that clip from the database and places them in a segment cache, which is essentially a vector of segments. However, when requesting an unbounded playback stream, the client may provide only a single time parameter. Therefore, the camera server is required to make some presumptions about what segments to initially obtain from the database and load into the segment cache. As the video is played back, newer segments will need to be added and older ones removed from the cache.

Figure 8A:
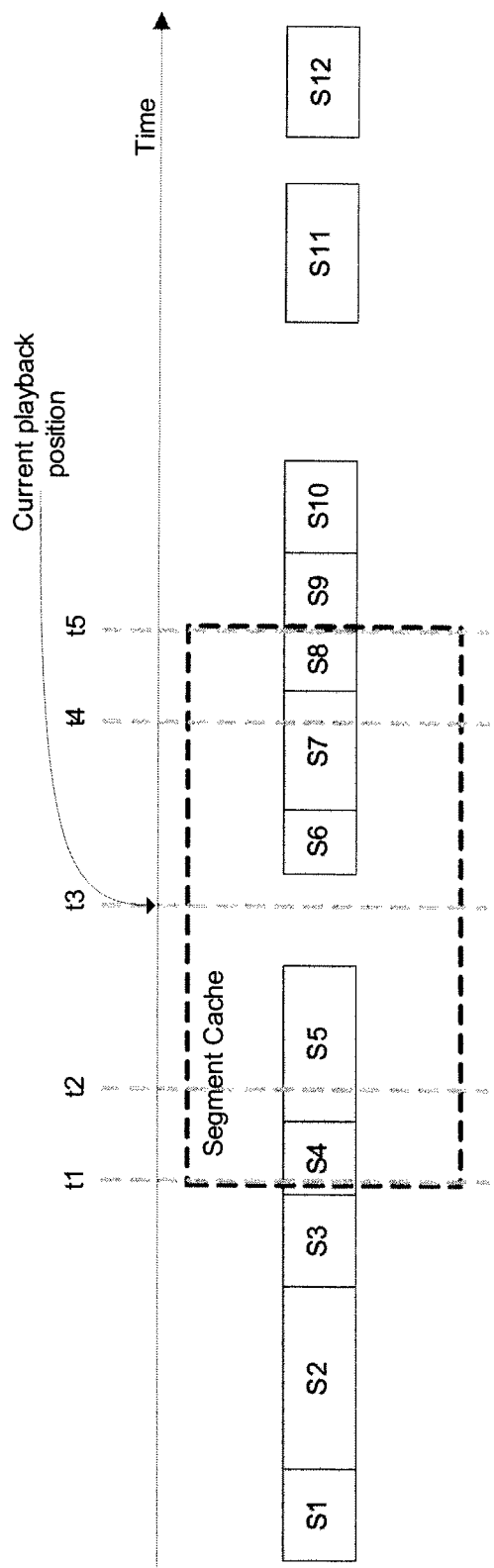
FIG. 8A schematically illustrates a caching approach according to one embodiment.

FIG. 8A shows a segment cache centered at the current playback position. That is, segments S4 to S8 are loaded in the cache and their file handles open. As playback continues, the position will eventually reach S8 and segments after it will need to be loaded into the cache. The segment caching strategy that is implemented determines when and how the new segments are loaded and old ones removed. Two strategies that are implemented in various embodiments are considered below.

Figure 8B:
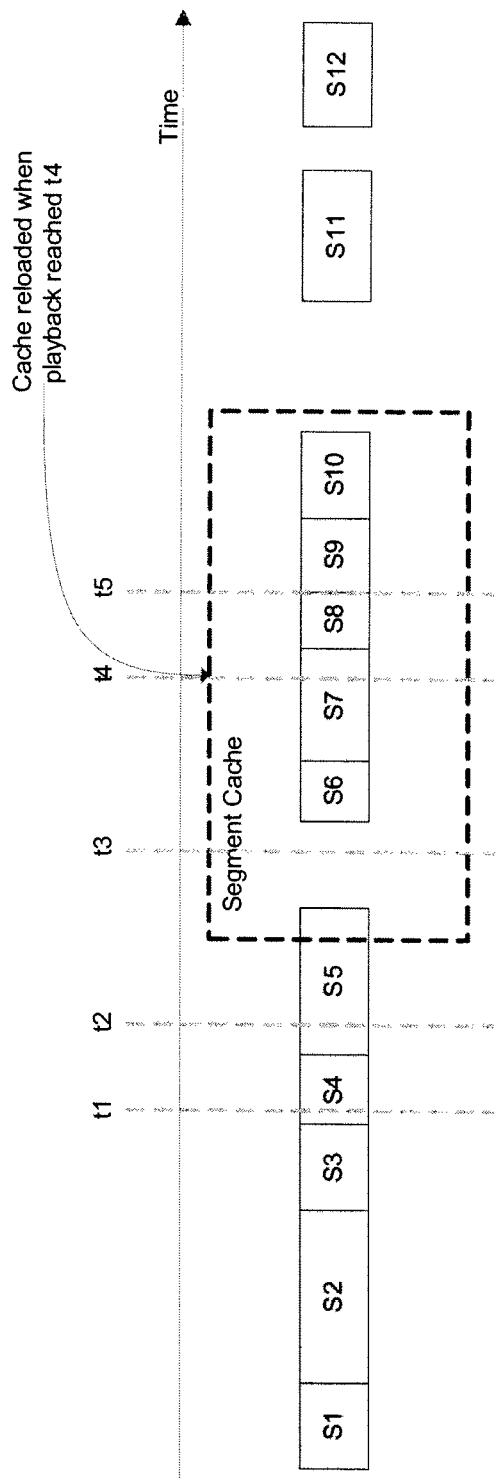
FIG. 8B schematically illustrates a caching approach according to one embodiment.

FIG. 8B illustrates a preemptive strategy. This refreshes the cache before playback overruns the cache. In this instance, the cache is refreshed when playback reaches t4. There is in some embodiments a need for an independent cache management thread that continually monitors the current position during playback and refreshes the cache before playback overruns the end of the cache. This strategy is preemptive because the cache management thread obtains newer segments before they are needed.

Figure 8C:
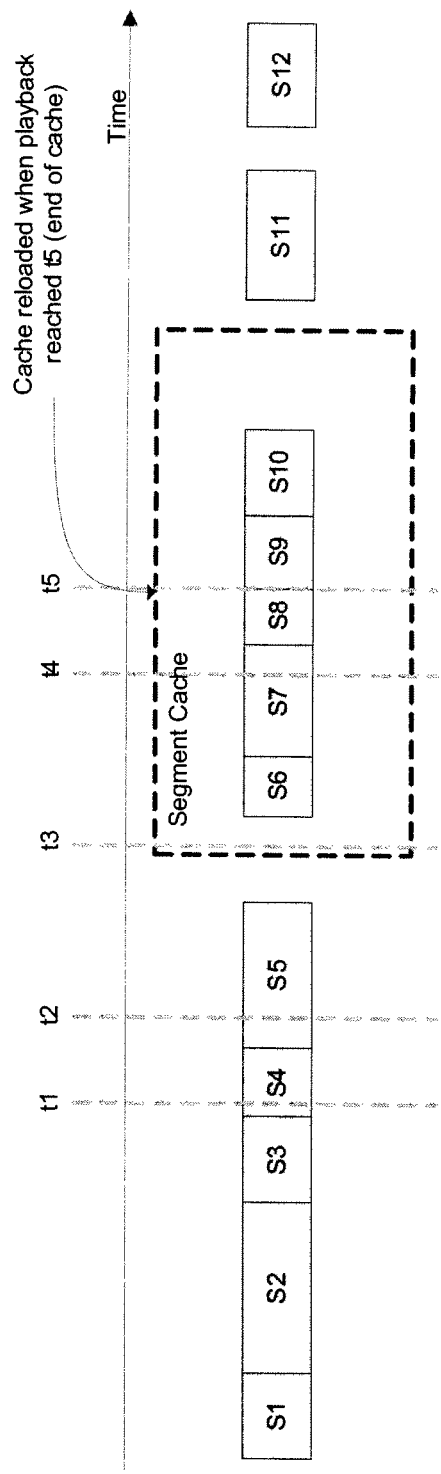
FIG. 8C schematically illustrates a caching approach according to one embodiment.

FIG. 8C illustrates a just-in-time strategy, which refreshes the cache only when newer segments are needed. In this instance, the cache is refreshed when playback reaches t5, which is the end of the cache. That is, the cache is refreshed only when new segments are needed. This is done in the same thread, as opposed to the preemptive strategy where a separate thread manages the cache.

A third alternative design choice is to use the preemptive strategy, but instead of creating a thread to monitor the cache, the playback thread will place a cache refresh request in the camera server's work thread. When the worker thread has retrieved a new recordset, it holds on to the results until the playback thread asks for it.

CONCLUSIONS

It will be appreciated that the disclosure above provides various significant systems and methods for managing video data. In particular, seamless playback is able to be achieved even where video data for a given period of time is distributed between camera servers.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A system for managing video data, the system including:
   a plurality of camera servers, wherein each camera server is configured to make available stored video data for one or more assigned cameras, wherein the plurality of camera servers include:
   a first camera server to which a first camera was assigned from time T.sub.0 to T.sub.n; and a second camera server for which the first camera server was assigned from time Tn+1 to Tn+i;
   wherein, in response to request from a client device to deliver video data for the first camera, the video data including video data at times T.sub.n and T.sub.n+1, the first camera server provides to the client device, in addition to the video data at time T.sub.n, data indicative of the second camera server;
   and wherein the data indicative of the second camera server, configures the client device to automatically obtain, from the second camera server, video data at T.sub.n+1 to T.sub.n+i for playback following playback of the video data at T.sub.n, thereby to enable seamless playback of video captured from the first camera from T.sub.0 to T.sub.n+1.

2. A system according to claim 1 including a client that is responsive to the data indicative of the second camera server for providing to the second camera server a request to deliver video data, the data including video data at $T_{n+1}$.

3. A system according to claim 2 wherein the first camera server provides the video data at $T_n$ in a terminal data packet including a plurality of sequential video frames prior to and including a video frame at $T_n$.

4. A system according to claim 3 wherein the client provides to the second camera server the request to deliver video data whilst rendering video frames of the terminal data packet.

5. A system according to claim 1 including a central database for maintaining data indicative of the camera server that makes available stored video data for each camera at given times.

6. A method performable by a first camera server for managing video data, the method including the steps of:
   (a) receiving, from a client device, data indicative of a request to deliver video data including video data at $T_n$ and $T_{n+1}$, wherein the data at $T_n$ is made available by the first camera server and the data at $T_{n+1}$ is made available by a second camera server; and
   (b) delivering, to the client, one or more data packets in response to the request, wherein one packet is a terminal packet including a plurality of sequential video frames prior to and including a video frame at $T_n$, and data indicative of the second camera server, wherein the data indicative of the second camera server configures the client device to automatically obtain, from the second camera server, video data at $T_{n+1}$ to $T_{n+i}$ for playback following playback of the video data at $T_n$, thereby to enable seamless playback of video captured from the first camera from $T_0$ to $T_{n+1}$.

7. A method for managing video data in a system including a plurality of camera servers, wherein each camera server is configured to make available stored video data for one or more assigned cameras, the method including the steps of:
   (a) receiving, from a client, a request to deliver video data in relation to a camera from $T_0$ to $T_x$;
   (b) querying a central database that maintains data indicative of the camera server that makes available stored video data for each camera at given times, thereby to identify the camera server or camera servers that make available the video data relating to the camera from $T_0$ to $T_x$;
   (c) identifying a first camera server that makes available video data relating to the camera at $T_0$;
   (d) instructing the first camera server to deliver to the client video data commencing at $T_0$, wherein for $T_n$ and $T_{n+1}$ between $T_0$ and $T_x$, the data at $T_n$ is made available by a first camera server and the data at $T_{n+1}$ is made available by a second camera server, and wherein first camera server provides to the client, in addition to the video data at $T_n$, data indicative of the second camera server; and
   wherein the data indicative of the second camera server configures the client device to automatically obtain, from the second camera server, video data at $T_{n+1}$ to $T_{n+i}$ for playback following playback of the video data at $T_n$, thereby to enable seamless playback of video captured from the first camera from $T_0$ to $T_{n+1}$.

8. A method performable by a first camera server for managing video data, the method including the steps of:
   (a) the first camera server receiving, from a client device, data indicative of a request to deliver video data including video data at $T_n$ and $T_{n+1}$, wherein the data at $T_n$ is made available by the first camera server and the data at $T_{n+1}$ is made available by a second camera server; and
   (b) the first camera server delivering, to the client, a first set of one or more data packets in response to the request, wherein the first set is for video data including a frame at $T_n$; and
   (c) the first camera server following delivery of the first set, delivering to the client a second set of video data including a video frame at $T_{n+1}$; and wherein the data indicative of the second camera server configures the client device to automatically obtain, from the second camera server, video data at $T_{n+1}$ to $T_{n+i}$ for playback following playback of the video data at $T_n$, thereby to enable seamless playback of video captured from the first camera from $T_0$ to $T^{n+1}$.

9. A method according to claim 8 wherein the second set of video data is obtained by the first camera server from a repository associated with the second camera server via UNC paths.

10. A method according to claim 8 wherein the second set of video data is obtained by the first camera server from the second camera server via a socket connection whereby the second camera server streams the second set of video data to the first camera server, which in turn streams the second set of video data to the client device.

* * * * *